United States Patent [19]
Zimmerman et al.

[11] Patent Number: 4,677,172
[45] Date of Patent: Jun. 30, 1987

[54] ELASTOMERIC COPOLYMERS OF ETHYLENE AND PROPYLENE, THE PRODUCTION AND USES THEREOF

[75] Inventors: Huguette Zimmerman, Martigues; Jean Vincent, Port de Bouc; Pierre Mangin, Martigues, all of France

[73] Assignee: BP Chemicals Limited, London, England

[21] Appl. No.: 792,968

[22] Filed: Dec. 6, 1985

Related U.S. Application Data

[63] Continuation of Ser. No. 579,001, Feb. 14, 1984, abandoned, which is a continuation of Ser. No. 355,779, Mar. 8, 1982, abandoned, which is a continuation of Ser. No. 165,360, Jul. 2, 1980, abandoned.

[30] Foreign Application Priority Data

Jul. 6, 1979 [FR] France .............................. 79 17546

[51] Int. Cl.$^4$ .............................. C08F 4/66
[52] U.S. Cl. .................... 526/159; 525/323; 526/142; 526/348
[58] Field of Search .............. 526/138, 159, 348; 525/323

[56] References Cited

U.S. PATENT DOCUMENTS

| | | | |
|---|---|---|---|
| 3,338,986 | 8/1967 | Leibson et al. | 525/323 |
| 3,378,606 | 4/1968 | Kontos | 525/323 |
| 3,435,095 | 3/1969 | Hostetler | 525/323 |
| 3,475,517 | 10/1969 | Renaudo | 525/323 |
| 3,853,969 | 12/1974 | Kontos | 525/323 |
| 3,906,056 | 9/1975 | Okamoto et al. | 525/323 |
| 4,013,823 | 3/1977 | Longi | 526/348 |
| 4,110,248 | 8/1978 | Sandis et al. | 252/429 B |
| 4,199,474 | 4/1980 | Sandis et al. | 252/429 B |
| 4,297,445 | 10/1981 | Short | 523/323 |
| 4,298,721 | 11/1981 | Borghi | 526/348 |
| 4,387,202 | 6/1983 | Falbe | 526/138 |

FOREIGN PATENT DOCUMENTS

| | | |
|---|---|---|
| 835864 | 5/1960 | United Kingdom . |
| 942703 | 11/1963 | United Kingdom . |
| 1367775 | 9/1974 | United Kingdom . |

OTHER PUBLICATIONS

CA, 77, 21089r.

*Primary Examiner*—Paul R. Michl
*Attorney, Agent, or Firm*—Brooks Haidt Haffner & Delahunty

[57] ABSTRACT

The invention concerns elastomeric copolymers of ethylene and propylene wherein the proportion by weight of units derived from ethylene is from 34 to 67% and the proportion by weight of units derived from propylene is from 33 to 66%. The copolymers are characterized in that 60% at least of the units derived from propylene are disposed in sequences of at least three successive units and that their fusion enthalpy, as measured after a given heat treatment, is lower than 15 cal/g (calories per gram) and in most cases is from 5 to 10 cal/g. The copolymers of the invention can be used in particular for the production of isotactic polypropylene compositions.

8 Claims, No Drawings

ELASTOMERIC COPOLYMERS OF ETHYLENE AND PROPYLENE, THE PRODUCTION AND USES THEREOF

This application is a continuation of application Ser. No. 579,001 filed on Feb. 14, 1984, abandoned, which, in turn, is a continuation of application Ser. No. 355,779 filed on Mar. 8, 1982 abandoned, which is a continuation of application Ser. No. 165,360 filed July 2, 1980, abandoned.

The preent invention concerns elastomeric copolymers of ethylene and propylene, which can be used for the production of isotactic polypropylene compositions.

In order to increase the impact strength of isotactic, polypropylene, at tempertures below 25° C., it is known to mix elastomers such as copolymers of ethylene and propylene, of low crystallinity, with the isotactic polypropylene. Copolymers of the above-indicated type, containing from 30 to 60% by weight of propylene, are generally produced by the polymerisation of a mixture of ethylene and propylene, in contact with a catalytic system with a low degree of stereospecificity, which in most cases comprises a vanadium compound such as vanadium oxychloride. However, only relatively small proportions of copolymers of ethylene and propylene, as mentioned above, may be mixed with the polypropylene, in order to ensure that the resulting compositions still enjoy satisfactory mechanical properties in the vicinity of and above ambient temperature; this has the result that the low-temperature impact strength of such compositions does not attain satisfactory values.

In order to remedy this disadvantage, it is a general practice to add to the compositions of isotactic polypropylene and the copolymers, as mentioned above, high-density polyethylene in proportions which are generally from 5 to 15% by weight of the mixture. The presence of polyethylene in the compositions, even in small proportions, results however in a deterioration in the mechanical properties thereof, at temperatures above 90° C. This is revealed in particular by a lower temperature of deformation under load.

Novel copolymers of ethylene and propylene have now been found, which have a particular microstructure and a low degree of crystallinity, which distinguish them from the previously known ethylene and propylene copolymers. Such copolymers find particular use in the production of improved isotactic polypropylene compositions.

The present invention concerns elastomeric copolymers of ethylene and propylene in which the proportion by weight of units derived from ethylene (Et) is from 34 to 67% and the proportion by weight of units derived from propylene (Pr) is from 33 to 66%, said copolymers being characterized in that 60% at least of the units derived from propylene are disposed in sequences of at least three successive units and that the degree of crystallinity thereof, expressed by means of the fusion enthalpy, as measured after a given heat treatment, is below 15 cal/g (calories per gram).

The proportion by weight (Pr) in the copolymers according to the invention, in respect of units derived from propylene, is measured by infra-red spectrophotometry at wave numbers of 720 cm$^{-1}$ and 1150 cm$^{-1}$, on a sheet of the molten copolymer at around 200° C. This method is derived from that described by Th. Gössl (in Die Makromolecular Chemie SLII—1-1-0—1960, page 1). Preferably, the copolymers of the invention have a proportion by weight of units resulting from ethylene which is from 45 to 60%, and a proportion by weight (Pr) of units derived from propylene which is from 40 to 55%.

It is known that generally, copolymers of ethylene and propylene comprise a chain of carbon atoms on which solely hydrogen atoms are fixed in the case of the units derived from ethylene, and hydrogen atoms and methyl radicals, in the case of the units derived from propylene. The chain can result from the random succession of units derived from ethylene and units derived from propylene. This is the case with the previously known low-crystallinity copolymers which in practice are produced by the polymerisation of a mixture of ethylene and propylene, in contact with a catalytic system with a low degree of stereospecificity, such as vanadium tetrachloride, associated with an organo-aluminium compound. By infrared spectrophotometric examination of such copolymers in he molten state, it has been observed that the units derived from propylene are, for the major part, distributed in the form of isolated links and paired links which consequently comprise a unit or two successive units resulting from propylene; on the other hand, chains which are formed by at least three successive units derived from propylene occur in a relatively small proportion. In contrast, the copolymers of the invention have a microstructure which is entirely different from that of the above-described copolymers, as the chains of at least three consecutive units derived from propylene represent at least 60% of the propylene-derived units; this means that the isolated links and the paired links represent less than 40% and generally from 5 to 25% only of the propylene-derived units.

This analysis of the microstructure of the copolymers is effected by spectrophotometry of the molten copolymers, at a temperature of about 200° C., in the range of infra-red radiation with wave numbers of from 900 to 1050 cm$^{-1}$, in accordance with the method disclosed in Example 1.

The presence in the copolymers of the invention of a preponderance of chains of at least three successive units derived from propylene could lead to the belief in the existence of crystalline polypropylene chains, in the structure of the copolymers. However, it has surprisingly been found that, in these copolymers, the degree of crystallinity of the polypropylene type remains low, and in most cases is lower than 10%. The crystallinity of polypropylene type is measured by infra-red spectrometry at wave numbers of 973 cm$^{-1}$, 998 cm$^{-1}$ and 842 cm$^{-1}$, on a sheet of copolymer, under the conditions disclosed in Example 1.

In the foregoing measurements, the wave number is equal to the inverse of the wavelength, expressed in centimeters.

In conformity with the results relating to the crystallinity due to the polypropylene, it has been observed that the overall crystallinity of the copolymers of the invention, which is evaluated by differential thermal analysis, is also low. Differential thermal analysis makes it possible to measure the fusion enthalpy of the copolymer, which corresponds to the amount of heat required to melt one gram of the copolymer. The above-mentioned amount of heat is linked with the spatial arrangement of the polymer as the amount of heat increases in proportion as the structure of the polymer is more highly ordered. Thus, the fusion enthalpy of high-density polyethylene which has a regular spatial arrangement is about 55 cal/g (calories per gram) under the measuring conditions described in Example 1, while that of isotactic polypropylene which also has a regular spatial arrangement is at least 30 cal/g, under the same conditions. Therefore, by reference to the fusion enthalpy of such homopolymers, it is possible to evaluate the degree of regularity of the spatial arrangement of the copolymers of the invention, and consequently, their relative crystallinity. It is observed in fact that the copolymers of the invention have a level of fusion enthalpy which is equal to or below than 15 cal/g, in most cases being from 5 to 10 cal/g under the measuring conditions described in Example 1.

Without limiting the copolymers of the invention too strictly to a given structure, it is possible, by virtue of the coherence of the analytical results set forth above, to draw up a hypothesis according to which the propylene-derived units would for the major part be in the form of chains which are regular in themselves but which are of fairly short length and which are ranomdly distributed in the copolymer in such a way that, in the solid state, the copolymer does not have a highly ordered spatial arrangement.

The copolymers of the invention are advantageously prepared by polymerisation of ethylene and propylene in the presence of a catalytic system comprising one or more solid compounds of titanium and one or more organo-metallic compounds of metals of groups II and III of the periodic table of elements.

The catalytic systems which can be used in the production of the copolymers of the invention are selected from systems which are capable of polymerising ethylene and propylene at similar speeds. These kinetic properties of the catalytic system, concerning the relative speeds of polymerisation of ethylene and propylene, are evaluated, in the production of an ethylene and propylene copolymer, by comparing the composition of the polymerisation medium, in respect of monomers, with that of the copolymer produced; the catalytic systems used are therefore preferably so selected that the composition of the copolymer is close to that of the mixture of monomers. Moreover, it has surprisingly been found that, without disadvantage, the catalytic systems could be highly stereospecific in the polymerisation of propylene alone, such stereospecificity being measured by the proportion of polypropylene produced, which is insoluble in boiling n-heptane; in highly specific catalytic systems, the above-mentioned proportion of polypropylene can reach 95% and more.

The preferred catalytic systems comprise: -one or more solid titanium compounds produced by the reduction of titanium tetrachloride by means of an organoaluminum compound, at a temperature of from $-10°$ to $80°$ C., and then heating the resulting precipitate for a period of some minutes to some hours, at a temperature which can reach $150°$ C. Preferably, the preparation operation is carried out in the presence of an electron donor compound or is followed by a treatment by means of an electron donor compound such as an aliphatic ether having the formula R'OR" wherein R' and R" are alkyl groups containing from 2 to 5 carbon atoms. Such titanium compounds can in particular be prepared in accordance with the U.S. Pat. No. 4,110,248—Sandis et al and U.S. Pat. No. 4,199,474,—Sandis et al issued Aug. 29, 1978 and April 22, 1980 respectively;

—as organo-metallic compounds of a metal of groups II and III of the periodic table, use can be made of one or more organo-aluminum compounds having the mean formula $AlR_xZ_{(3-x)}$ wherein R represents an alkyl group containing from 2 to 12 carbon atoms, Z represents a hydrogen atom or a halogen, such as chlorine or bromine, and x represents an integer or a fraction which can be of any value from 1 to 3. These organo-metallic compounds are advantageously used in amounts such that the atomic ratio: metals of groups II and III of the organo-metallic compounds/titanium of the titanium compounds, is from 1 to 50.

The components of the catalytic system can be used in different ways.

The titanium compounds can be introduced directly into the polymerisation reaction vessel, or may be associated with a carrier comprising solid granules, or in the form of a prepolymer which is produced by means of preliminary polymerisation of ethylene alone, propylene alone or a mixture of ethylene and propylene, in the presence or in the absence of a liquid diluent and in the presence of a catalytic system as defined above. The pre-polymer can be produced by the polymerisation of from 1000 to 5000 moles of olefin per gram-atom of titanium in the catalyst; accordingly, the amounts of pre-polymer used remain low with respect to the amounts of co-polymer which is finally produced so that the properties thereof are not substantially altered.

The organo-metallic compound or compounds of a metal of groups II and III of the periodic table can also be introduced directly into the polymerisation reaction vessel. These compounds can also be used in the form of a porous carrier previously impregnated with such compounds, in which case the porous carrier may be formed by solid granules, of organic or inorganic nature, or may be formed by the pre-polymer mentioned in the preceding paragraph.

Polymerisation is generally carried out at a pressure of less than 40 bars and at a temperature of from $40°$ to $90°$ C. and preferably from $50°$ to $80°$ C. This operation can be carried out by bringing together the monomers, ethylene and propylene, and also the components of the catalytic system, in the absence or in the presence of a liquid diluent comprising, for example, propylene and-/or a saturated aliphatic hydrocarbon. Preferably, polymerisation is carried out in the absence of diluent, by direct contact of the monomers in the gaseous state with solid particles of the copolymer in the course of formation and with the components of the catalytic system, possibly in association with a granular carrier or a pre-polymer. This operation is advantageously effected by circulating the monomers in the gaseous state through a fluidised bed of solid particles of the copolymer in the course of formation. Furthermore, polymerisation can be carried out in the presence of a chain growth limiter which generally comprises hydrogen and the proportion of which with respect to the olefins in the polymerisation medium is from 1 to 20%, thereby to produce a copolymer having the desired mean molecular weight.

In order to produce copolymers having the above-mentioned characteristics, it is preferable for the ratio between the amounts of ethylene and propylene present in the polymerisation medium to be maintained at a substantially constant value throughout the polymerisation operation. This condition can be achieved by means of an apparatus comprising on the one hand an analyser for measuring the ratio between the concentrations in respect of ethylene and propylene in the polymerisation medium and, on the other hand, means for introducing ethylene and propylene into the reaction vessel, in amounts controlled by the analyzer.

The copolymers of the invention can be used for the production of isotactic polypropylene compositions which have increased impact strength at temperatures below 25° C. Such compositions are prepared by intimately mixing, at a temperature of from 150° to 200° C., up to 70 parts by weight and preferably from 5 to 50 parts of copolymer and 100 parts by weight of isotactic polypropylene. Starting from isotactic polypropylene and copolymer, in powder or in granule form, the mixing operation is conveniently performed in a mixer which has a shearing action, such as a malaxator, a calender or a single-screw or double-screw extruder. This operation can be carried out in one or more passes; it may also be preceded by a simple mixing step. In the course of operation, additives such as conventional stabilising agents may be added to the mixture.

The resulting compositions have better properties than the previously known polypropylene compositions which enjoy a high level of impact strength. As is shown in Examples 6, $C_3$ and $C_4$, he compositions containing copolymers of the present invention have Charpy impact strength at a temperature below 25° C., which is much greater than tht of the compositions containing previously known copolymers, with the same modulus of elasticity. Still with the same modulus of elasticity, the compositions containing copolymers according to the invention have, above a temperature of 90° C., a Vicat temperature and a temperature of deformation under load, which are higher than the previously known compositions which also contain high-density polyethylene.

On a probable hypothesis, these properties may result from the particular microstructure of the copolymers of the invention which, while contributing to the compositions impact strength properties, would have a better degree of compatibility with the crystalline matrix of the isotactic polypropylene. This would be revealed by improved cohesion in respect of the components of the composition which accordingly have better physical and mechanical properties.

The copolymers of the invention which are produced by direct polymerisation of the olefins in the gaseous state enjoy an additional advantage. They occur in the form of powders, which enhances intimate mixing with the isotactic polypropylene. In contrast, the previously known copolymers generally occur in the form of rubbery masses which have to be milled before being mixed with the isotactic polypropylene; in spite of this milling, it is difficult to produce homogeneous mixtures from such copolymers.

EXAMPLE 1

1-1. Preparation of a copolymer

1-1. (a) Preparation of a catalytic titanium compound 380 g (2 moles) of titanium tetrachloride, 120 ml of anhydrous n-heptane and 27 g (170 mmoles) of diisoamyl ether are introduced into a stainless steel 1 liter reaction vessel. The mixture is heated at a temperature of 35° C., in an agitated state, and a mixture of 30 g (250 mmoles) of diethylaluminium chloride and 70 g (440 mmoles) of diisoamyl ether dissolved in 180 ml of n-heptane are introduced into the mixture at a regular rate in 4 hours.

The resulting precipitate is maintained in an agitated condition for 1 hour at 35° C. and then for 2 hours at 65° C. The solid titanium compound is then washed 5 times by mixing with 500 ml of n-heptane at 65° C., and decantation. It is preserved in n-heptane, protected from air and moisture.

1-1. (b) Preparation of a pre-polymer 4.1 g (34 mmoles) of diethylaluminium chloride in molar solution in n-heptane and an amount of the suspension of the titanium compound as prepared in (a) above, corresponding to 11.4 milligram-atoms of titanium, are introduced into a 5 liter reaction vessel containing 2 liters of anhydrous n-heptane at 60° C.

With agitation, and with the medium being maintained at a temperature of 60° C., propylene is introduced at a constant rate of 200 g/h or a period of 4 hours 15 minutes. To the suspension of pre-polymer which is formed, the suspension bein cooled to ambient temperature, there is added 16.7 g (45.6 mmoles) of tri-n-octylaluminium in solution in n-heptane, under vacuum. This result in 900 g of a fluid pre-polymer powder which is of rose-violet colour and which is preserved in nitrogen, protected from air and moisture.

1-1. (c) Production of the copolymer

Copolymerisation is carried out in a fluidised bed reaction vessel which is 15 cm in diameter and which contains 3.6 kg of polymer in powder form in the course of polymerisation.

The fluidisation gas issuing from the reaction vessel is recycled by means of a blower; it comprises a mixture, by volume, of 60% ethylene and 40% propylene, at a pressure of 20 bars. The composition and pressure of the gases are kept at constant values by the addition of monomers in amounts equal to the amounts consumed during polymerisation.

The fluidised bed is maintained at a temperature of 65° C. by controlling the temperature of the incoming gas.

The reaction vessel is supplied with pre-polymer as prepared in 1-1. (b) above, at a rate of 8.5 g/h; the hourly production rate is steady at 600 g/h of copolymer which is removed from the reaction vessel at a rate of 100 g/h every 10 minutes so as to preserve a substantially constant height of bed. The powder produced is not sticky; its specific gravity is 0.36 g/cm$^3$ and its mean granulometry is 800 microns. It contains 8 ppm of titanium.

1-2. Phyical analyses

Proportion of units derived from propylene

A film of the copolymer, about 200 microns in thickness, is disposed between two pellets of potassium bromide, the distance between which is maintained at 200 microns by means of a brass supporting member or chock. The assembly is placed in a heating block for heating at a temperature of 225° C. This temperature is maintained for 10 minutes and then the assembly is transferred with the heating block to a PERKIN-ELMER IR spectrophotometer model 521, in which it is maintained at 225° C. The optical densities $D_1$ at 720 cm$^{-1}$ and $D_2$ at 1150 cm$^{-1}$ are measured. The proportion of units derived from propylene (Pr), being 36%, is determined by means of a chart or abacus.

Crystallinity of polypropylene type

This method is based on that described by QUYNN et coll. in Journal of Applied Polymer Science Volume II, No 5 pages 166-173 (1959). A film which is about 150 microns in thickness is reheated in nitrogen at 130° C. for 1 hour and then very slowly cooled to 25° C. It is examined in a PERKIN-ELMER IR spectrophotometer model 521, at between 800 and 1050 cm$^{-1}$. Taking the optical densities measured at 842 cm$^{-1}$, 998 cm$^{-1}$ and 973 cm$^{-1}$ and by means of a chart or abacus, the proportion of propylene-derived units engaged in a crystalline structure is evaluated. In the case of the sample of Example 1, the above-mentioned proportion is 3%, corresponding to overall crystallinity of about 1%.

Distribution of the units derived from propylene

This analysis operation is carried out on the same sample of copolymer and with the same apparatus as for determining the proportion of propylene-derived units. The spectrum recorded in the region of infra-red radiation at between 900 and 1050 cm$^{-1}$ is analysed by means of a computer, using the method referred to as the deconvolution method, which makes it possible to show a band at 939 cm$^{-1}$, corresponding to the isolated links of a single propylene-derived unit, and a band at 955 cm$^{-1}$ corresponding to the paired links of two successive propylene-derived units. Spectral analysis is continued in the usual way, starting from measurement of the heights of the bands which are produced in the above-described manner. The proportion of chains of at least three successive propylene-derived units is obtained by reference to the difference, based on the total proportion of propylene-derived units contained in the copolymer, and the results of the above-described spectral analysis. The ratio R represents the proportion, expressed as a percent, of propylene-derived units present in the form of chains of at least three successive units with respect to the total of the propylene-derived units. In the case of the sample of Example 1, the above-mentioned proportion is 62%.

Fusion enthalpy

This measurement operation is carried out by means of a PERKIN-ELMER sweep-type differential microcalorimeter. The enthalpic diagram of a sample of 5 mg of the copolymer is recorded by heating at 16° C./minute up to a temperature of 200° C. (the sample is previously subjected to a heat treatment comprising heating at 16° C./minute to a temperature of 200° C., followed by holding that temperature for 20 minutes, and cooling at 16° C./minute to 50° C.). The area of the endothermic peak recorded in the course of the heating step is proportional to the enthalpy.

The fusion temperature of the copolymer is measured on the above-mentioned enthalpic diagram.

Solubility in n-heptane is equal to the proportion, expressed in percent by weight, of copolymer which is soluble in boiling n-heptane.

The whole of the results are set out in Table I attached.

EXAMPLE 2

Using the same pre-polymer and in the same apparatus as in Example 1-1. (c) above, a mixture comprising, by volume, 28% ethylene, 70% propylene and 2% hydrogen is polymerised. The reaction vessel which is maintained at a temperature of 60° C. is fed with 37 g/h of pre-polymer. 300 g/h of copolymer is formed.

The copolymer is analysed as described in Example 1 and the results are set out in Table I.

EXAMPLE 3

3. (a) Preparation of a catalytic titanium compound

A catalytic titanium compound is prepared as described in Example 1-1. (a). The n-heptane is evaporated under vacuum from the suspension of the solid titanium compound, which suspension is produced after washing. The resulting dry titanium compound is preserved in nitrogen.

3. (b) Preparation of a pre-polymer 200 g of an ethylene and propylene copolymer powder such as that produced in Example 1-1. (c) above, is introduced into a 2 liter reaction vessel provided with an agitator for agitating powder and a double-jacket cooling or heating means.

After the addition of 8 g (21.8 mmoles) of tri-n-octyl-aluminium, the mixture is agitated for 15 minutes. There is then added an amount of the compound prepared in 3. (a) above, corresponding to 4.85 milligram-atoms of titanium.

The powder mixture is raised to a temperature of 50° C., with agitation, and a gaseous mixture containing by volume 67% ethylene and 33% propylene is introduced into the powder mixture, under a pressure of 1.5 bars, over a period of 2 hours. 395 g of a fluid pre-polymer powder containing 1.26 milligram atom of titanium per 100 g is obtained.

3. (c) Preparation of a copolymer

Taking the pre-polymer prepared in 3. (b) above and in the same apparatus as in Example 1-1. (c) above, a mixture comprising by volume 49% ethylene, 50% propylene and 1% hydrogen is polymerised. The reaction vessel is maintained at a temperature of 60° C. and is supplied with 17.3 g/h of pre-polymer. 300 g/h of copolymer is formed.

The copolymer is analysed as in Example 1 and the results appear in Table I.

EXAMPLE 4

4. (a) Preparation of the pre-polymer

Operation is as described in Example 1-1. (b), using 41 mmoles of diethylaluminium and an amount of the suspension of titanium compound as prepared in accordance with Example 1-1. (a) above, which contains 10.2 milligram-atoms of titanium. After hydrogen has been introduced into the reaction vessel until the pressure is 5 bars, the reaction vessel is supplied with ethylene at a flow rate of 160 g/h for a period of 4 hours. The temperature is maintained at 70° C. during the pre-polymerisation step.

After this operation is stopped, 4 millimoles of tri-n-octylaluminium is added to the pre-polymer suspension, and the pre-polymer is dried under vacuum.

840 g of a fluid powder is produced, which is kept in nitrogen, protected from air and moisture.

4. (b) Polymerisation 150 g of the powder of pre-polymer prepared as set forth in Example 4. (a) is introduced into the same fluidised bed reaction vessel as that described in Example 1-1. (c), which is 15 cm in diameter. A mixture comprising by volume 40% propylene and 60% ethylene is passed at a pressure of 20 bars through the fluidised bed which is at a temperature of 60° C.

After 3 hours of reaction, 1390 g of a copolymer formed by a dry powder is produced.

The copolymer is analysed as in Example 1 and the results appear in Table I.

Comparative Example $C_1$ 2 liters of anhydrous n-heptane at 25° C. and then, in succession, 4 millimoles of diethylaluminium chloride and 0.8 mmoles of vanadium tetrachloride, both being in solution in n-heptane, are introduced into a stainless steel 5 liter reaction vessel provided with a mechanical agitator and a double-jacket heating and cooling means. The reaction vessel is then fed with a gaseous mixture comprising 33% ethylene and 67% propylene, under a pressure of 3 bars, the reaction medium being maintained at a temperature of 40° C. After 20 minutes of polymerisation, the medium becomes too viscous for effective agitation thereof, and the input of gas is stopped. The catalyst is de-activated and the polymer is precipitated by adding to the reaction mixture, 4 liters of an equal-part mixture of acetone and methanol.

50 g of a white polymer of rubbery appearance is produced.

The copolymer is analysed as described in Example 1 and the results appear in Table I.

Comparative Example $C_2$

Operation is carried out under conditions which ar identical to those of Example $C_1$, except that the gaseous mixture comprises 17% of ethylene and 83% of propylene.

48 g of a white copolymer of rubbery appearance is produced.

The copolymer is analysed as described in Example 1 and the results appear in Table I.

EXAMPLE 5

The copolymer prepared as described in Example 1-1. (c) is used to produce an isotactic polypropylene composition which has improved impact strength.

The isotactic polypropylene comprises a powder having the following characteristics:
  fluidity index at 230° C. under a load of 2.16 kg (ASTM 1238-65 T): 4.5
  bending strength (measured on a DYNASTAT apparatus using the CEMP method): 63.5 MPa
  Charpy impact strength: 3 at 23° C.; breaking at 0° C.

1 kg of powder of the copolymer produced in accordance with Example 1-1. (c) is added to 9 kg of the above-indicated polypropylene. The fact that the copolymer used is in the form of powder is an advantage as the first step in the mixing operation is easily performed in a Herfeld powder mixer.

The mixtures of powders is introduced into a Werner double-screw extruder (23 mm in diameter) wherein gelation and malaxating produce an intimate mixture and result in a highly homogeneous composition. After granulation, the mechanical properties of the composition are measured, by comparing them to the mechanical properties of the basic polypropylene. The bending strength is 51.5 MPa; the Charpy impact strength is then 6 at 23° C. and 3 at 0° C.

EXAMPLE 6 and Comparative Examples $C_3$ and $C_4$

For the purposes of comparison, taking the same basic polypropylene as in Example 5, and using identical conditions, three compositions having the same modulus of tensile elasticity and comprising the components set forth in Table II were prepared. Table II also shows the Charpy impact strength at −40° C., the Vicat temperature and the temperature of deformation under load.

It will be seen that the composition of Example $C_3$ which was prepared from the copolymer of Example $C_2$ has Charpy impact strength at −40° C., which is markedly lower than that of the composition of Example 6. In the composition of Example $C_4$, the attempt was made to raise the Charpy impact strength at −40° C., by replacing a part of the isotactic polypropylene of the composition of Example $C_3$, by crystalline polyethylene. In this case however, it is found that the Vicat temperature and the temperature of deformation under load suffer from a substantial reduction.

TABLE I

| EXAMPLE | (Pr) (%) | Polypropylene type crystallinity (%) | R* (%) | Fusion enthalpy (cal/g) | Fusion temperature (°C.) | Solubility in n-heptane (%) |
|---|---|---|---|---|---|---|
| 1 | 36 | 1 | 62 | 4.6 | 115 | 65 |
| 2 | 60 | 6 | 91.4 | 1.5 | 110–120 | 87 |
| 3 | 48 | <1 | 72 | 3.8 | 116 | 78.5 |
| 4 | 33 | <1 | 60 | 14.5 | 120–123 | 64 |
| $C_1$ | 33 | <1 | 41 | <1 | no fusion peak | 100 |
| $C_2$ | 56 | <1 | 45 | <1 | no fusion peak | 100 |

*R = proportion (in %) of propylene-derived units present in the form of chains of at least 3 units

TABLE II

| EXAMPLE | Composition (parts by weight) | Modulus of tensile elasticity (MPa) Standard NFT 51034 | Charpy impact strength at −40° C. (kg/m²) | Vicat temperature under 1 kg (0° C.) Standard NFT 51021 | Temperature of deformation under a load of 4.6 kg (0° C.) Standard NFT 51005 |
|---|---|---|---|---|---|
| 6 | Isotactic polypropylene: 70 Copolymer of Example 1-1.c: 30 | 850 | 30 | 137 | 92 |
| $C_3$ | Isotactic polypropylene: 75 Copolymer of Example $C_2$: 25 | 850 | 20 | 138 | 93 |

TABLE II-continued

| EXAMPLE | Composition (parts by weight) | Modulus of tensile elasticity (MPa) Standard NFT 51034 | Charpy impact strength at −40° C. (kg/m²) | Vicat temperature under 1 kg (0° C.) Standard NFT 51021 | Temperature of deformation under a load of 4.6 kg (0° C.) Standard NFT 51005 |
|---|---|---|---|---|---|
| C4 | Isotactic polypropylene: 65 Copolymer of Example C2: 25 Crystalline polyethylene with density of 0.960: 10 | 850 | 30 | 130 | 88 |

We claim:

1. A process for the preparation of elastomeric copolymers of ethylene and propylene containing by weight from 34 to 67% of units derived from ethylene and from 33 to 66% by weight of units derived from propylene which comprises copolymerizing ethylene and propylene in the vapor phase in a fluidized bed in the presence of a catalyst system capable of polymerizing ethylene and propylene at similar speeds, said catalyst system comprising one or more compounds of titanium in solid form and one or more organo-metallic compounds of Groups II and III of the periodic table of elements, maintaining the ratio of amounts of ethylene and propylene substantially constant throughout the polymerization reactions, so that a powdered copolymer is formed having at least 60% of the units derived from propylene disposed in sequences of at least three successive units and a low crystallinity evidenced by a fusion enthalpy of less than 15 calories per gram as measured by differential thermal analysis of a sample of the copolymer subjected to previous heat treatment of 16° C. per minute to 200° C. with a hold for 20 minutes at 200° C. followed by cooling at a rate of 16° C. per minute to 50° C.

2. A process as defined in claim 1, wherein the copolymerization is carried out at a pressure of less than 40 bars and a temperature of from 40° to 90° C.

3. A process as claimed in claim 1 wherein:
the titanium compounds are produced by the reduction of titanium tetrachloride by means of an organo-aluminum compound at a temperature of from −10° to 80° C. and then heating the resulting precipitate at a temperature up to 150° C., the preparation of said titanium compounds comprising a treatment by an electron donor compound,
the organo-metallic compounds of metals of groups II and III of the periodic table are formed by organo-aluminum compounds having the mean formula $AlR_xZ_{(3-x)}$, wherein R represents an alkyl group containing from 2 to 12 carbon atoms, Z represents a hydrogen atom or a halogen and x represents an integer or a fraction which can be of any value of from 1 to 3.

4. A process as claimed in claim 1 wherein the ratio between the concentrations in respect of ethylene and propylene in the polymerization medium is maintained constant throughout the polymerization operation.

5. A process as claimed in claim 1 wherein copolymerization of ethylene and propylene is effected by contacting the monomers in the gaseous state with solid particles of the copolymer in the course of formation and with the components of the catalytic system.

6. A process as claimed in claim 3 in which the precipitate is heated for a time ranging from some minutes to some hours.

7. A process as claimed in claim 3 in which the donor compound is an aliphatic ether having the formula R'OR" in which R' and R" are $C_2$–$C_5$ alkyl groups.

8. A process as claimed in claim 3 in which the halogen is bromine or chlorine.

* * * * *

UNITED STATES PATENT AND TRADEMARK OFFICE
CERTIFICATE OF CORRECTION

PATENT NO. : 4,677,172
DATED : June 30, 1987
INVENTOR(S) : Huguette Zimmerman

It is certified that error appears in the above-identified patent and that said Letters Patent is hereby corrected as shown below:

Col. 3, line 20, "ranomdly" should read -- randomly --

Col. 5, line 22 "he compositions" should read
        -- the compositions --

Col. 6, line 52 "1-2 Phyical analyses" should read
        -- 1-2 Physical analyses --

Signed and Sealed this

Eighth Day of December, 1987

Attest:

DONALD J. QUIGG

Attesting Officer

Commissioner of Patents and Trademarks